(12) United States Patent
Hoshi

(10) Patent No.: US 11,718,118 B2
(45) Date of Patent: Aug. 8, 2023

(54) RECORDING MEDIUM, EXTERIOR MEMBER, AND METHOD OF RECORDING ON RECORDING MEDIUM

(71) Applicant: Sony Corporation, Tokyo (JP)

(72) Inventor: Mitsunari Hoshi, Kanagawa (JP)

(73) Assignee: Sony Corporation, Tokyo (JP)

( * ) Notice: Subject to any disclaimer, the term of this patent is extended or adjusted under 35 U.S.C. 154(b) by 351 days.

(21) Appl. No.: 16/956,228

(22) PCT Filed: Nov. 28, 2018

(86) PCT No.: PCT/JP2018/043691
§ 371 (c)(1),
(2) Date: Jun. 19, 2020

(87) PCT Pub. No.: WO2019/124003
PCT Pub. Date: Jun. 27, 2019

(65) Prior Publication Data
US 2021/0078349 A1 Mar. 18, 2021

(30) Foreign Application Priority Data

Dec. 20, 2017 (JP) .................................. 2017-243544

(51) Int. Cl.
*B41M 5/30* (2006.01)
*B41M 5/42* (2006.01)
(Continued)

(52) U.S. Cl.
CPC .............. *B41M 5/42* (2013.01); *B41M 5/426* (2013.01); *B41M 5/46* (2013.01);
(Continued)

(58) Field of Classification Search
CPC ...... B41M 5/305; B41M 5/3275; B41M 5/42; B41M 5/426; B41M 5/46; B41M 5/465; B41M 2205/04; B41M 2205/38; G11B 7/00455; G11B 7/24038; G11B 7/244; G11B 7/2578
See application file for complete search history.

(56) References Cited

U.S. PATENT DOCUMENTS 8,975,012 B2 * 3/2015 Dunn ..................... B32B 27/36
430/502

FOREIGN PATENT DOCUMENTS

CN 101104350 A 1/2008
CN 101676122 A 3/2010
(Continued)

OTHER PUBLICATIONS

International Search Report dated Jan. 8, 2019 in connection with PCT/JP2018/043691.

*Primary Examiner* — Gerard Higgins
(74) *Attorney, Agent, or Firm* — K&L Gates LLP

(57) ABSTRACT

A recording medium according to one embodiment of the present disclosure includes a recording layer and an optical thin film. The recording layer includes a heat-sensitive color-developing composition and a photothermal conversion material. The photothermal conversion material absorbs a wavelength in an infrared region and generates heat. The optical thin film is provided on one surface of the recording layer. The optical thin film reflects the wavelength in the infrared region and transmits a wavelength in a visible region.

12 Claims, 10 Drawing Sheets

(51) Int. Cl.
*B41M 5/46* (2006.01)
*G11B 7/24038* (2013.01)
*G11B 7/244* (2006.01)
*G11B 7/2578* (2013.01)
*G11B 7/0045* (2006.01)
*B41M 5/327* (2006.01)
*B41M 5/333* (2006.01)
*G11B 7/254* (2013.01)

(52) U.S. Cl.
CPC .......... *G11B 7/00455* (2013.01); *G11B 7/244* (2013.01); *G11B 7/24038* (2013.01); *G11B 7/2578* (2013.01); *B41M 5/305* (2013.01); *B41M 5/3275* (2013.01); *B41M 5/3335* (2013.01); *B41M 5/465* (2013.01); *B41M 2205/04* (2013.01); *B41M 2205/38* (2013.01); *G11B 2007/25408* (2013.01)

(56) References Cited

FOREIGN PATENT DOCUMENTS

| | | |
|---|---|---|
| CN | 101791918 A | 8/2010 |
| JP | 08-230325 | 9/1996 |
| JP | H08-230325 A | 9/1996 |
| JP | 2001-353971 | 12/2001 |
| JP | 2001-353971 A | 12/2001 |
| JP | 2003-136846 | 5/2003 |
| JP | 2003-136846 A | 5/2003 |
| JP | 2004-074584 | 3/2004 |
| JP | 2004155011 A | 6/2004 |
| JP | 2004168024 A | 6/2004 |
| JP | 2004-255625 | 9/2004 |
| JP | 2004-255625 A | 9/2004 |
| JP | 2006-103221 | 4/2006 |
| JP | 2006-103221 A | 4/2006 |
| JP | 2013-158930 | 8/2013 |
| JP | 2013-158930 A | 8/2013 |

* cited by examiner

[ FIG. 1 ]
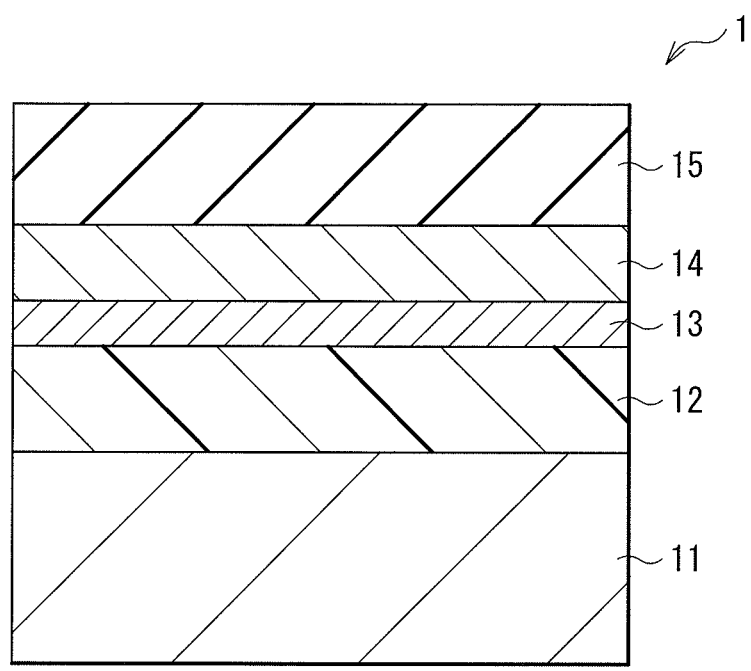

[FIG. 2]
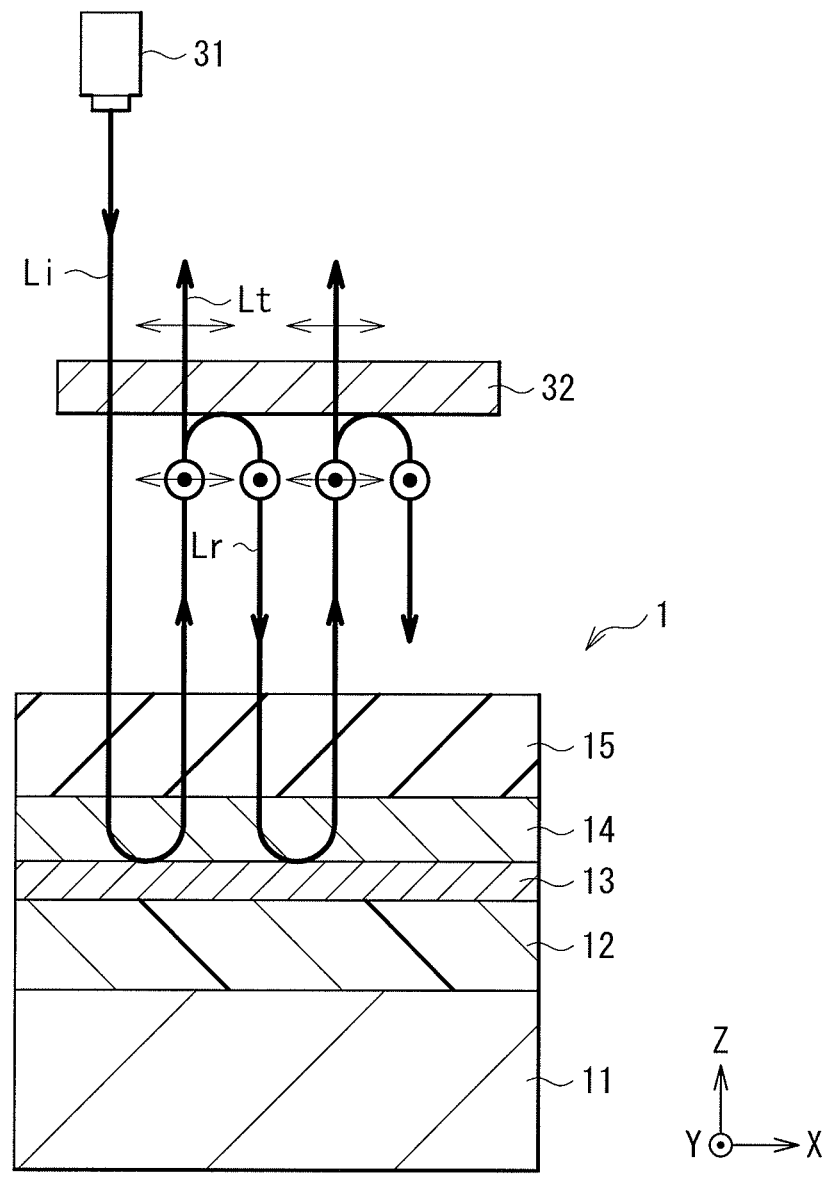

[FIG. 3]
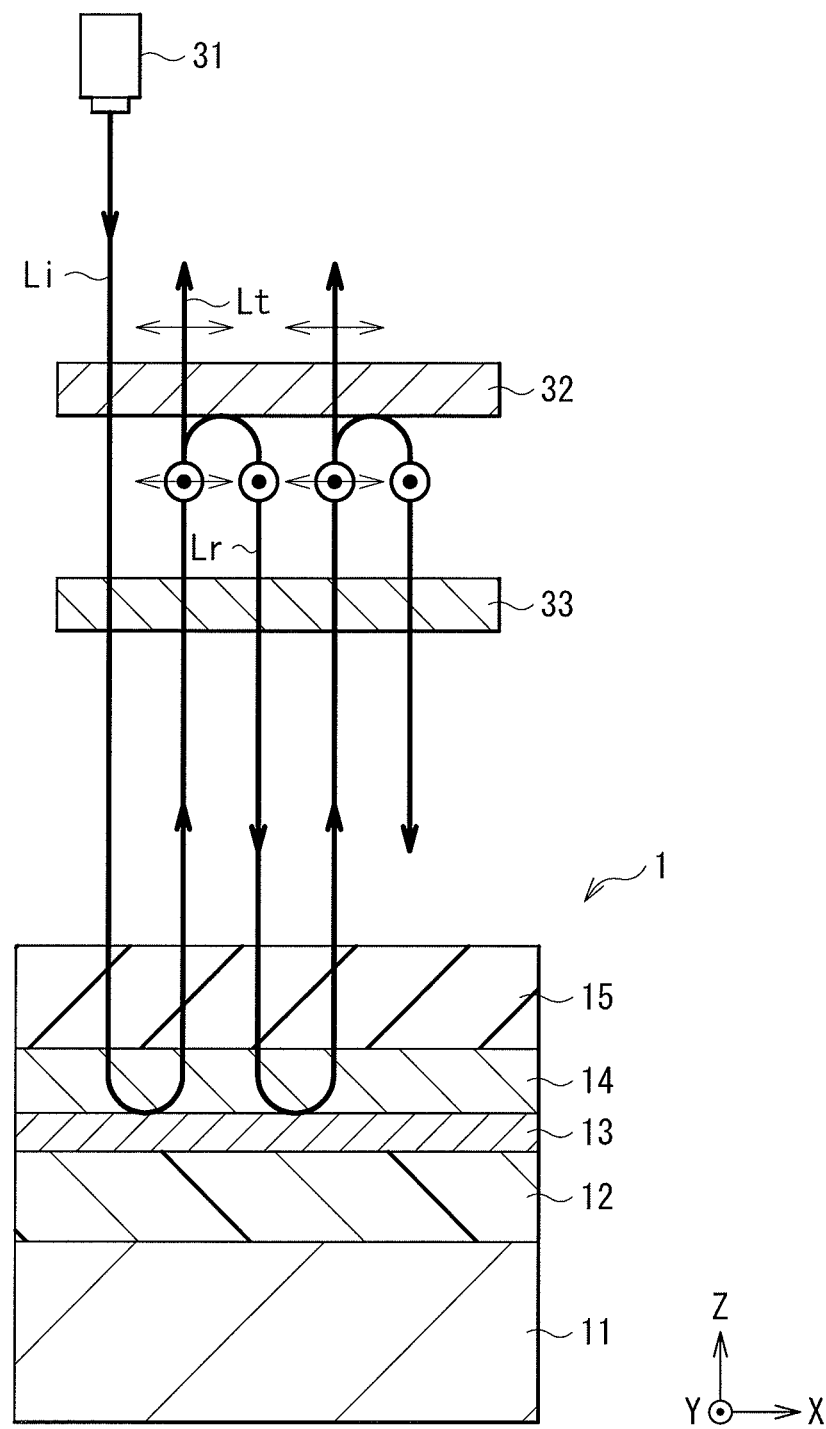

[ FIG. 4 ]
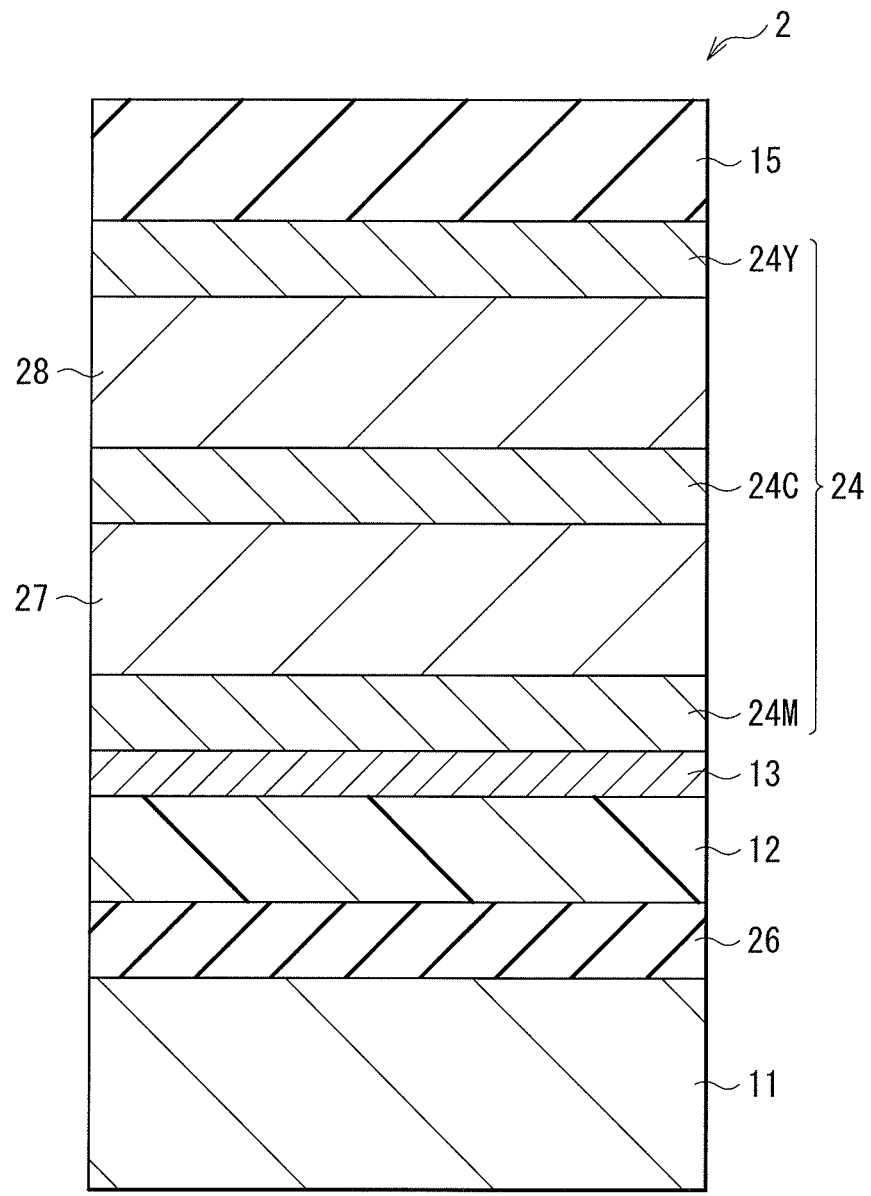

[ FIG. 5A ]
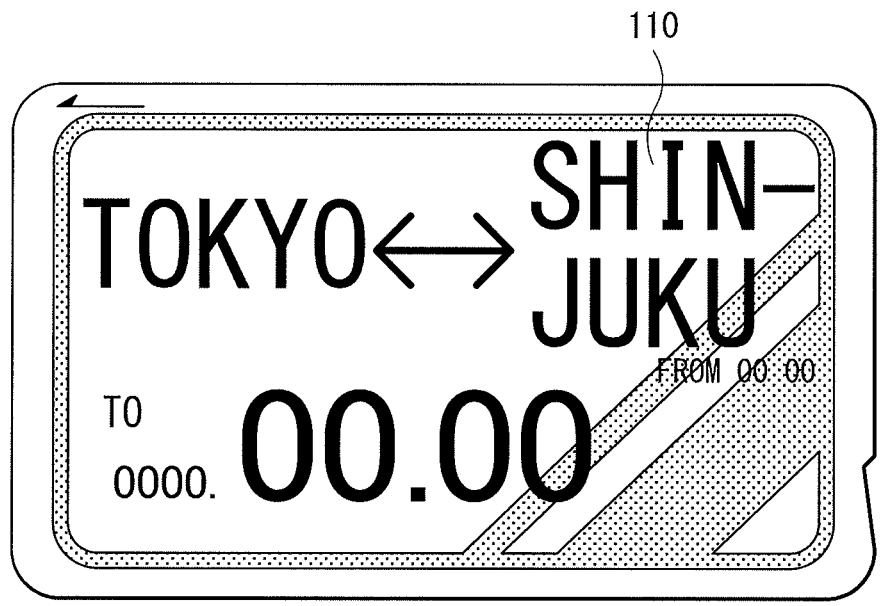
[ FIG. 5B ]
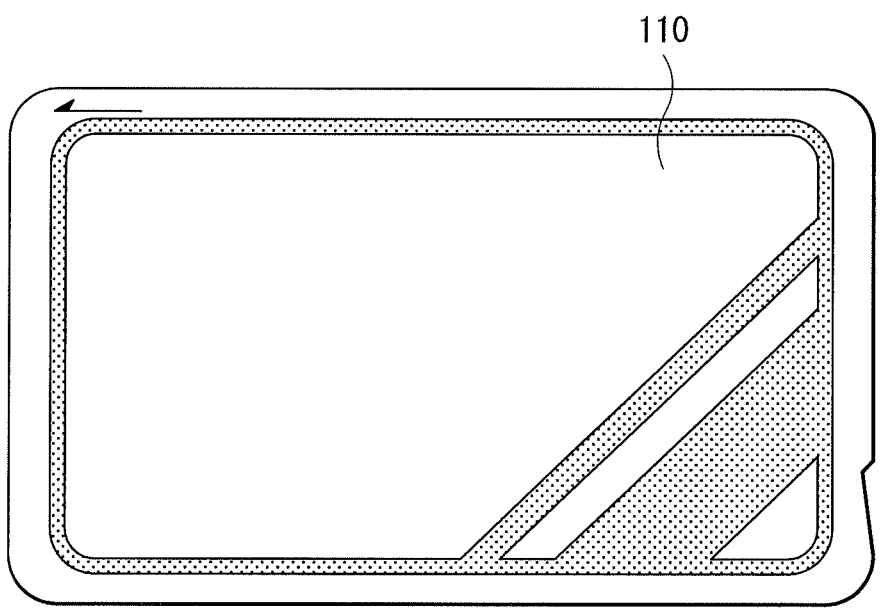

[ FIG. 6A ]
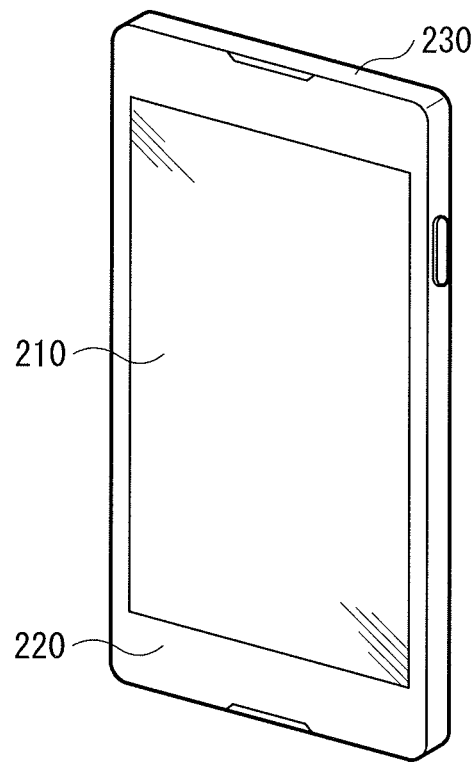
[ FIG. 6B ]
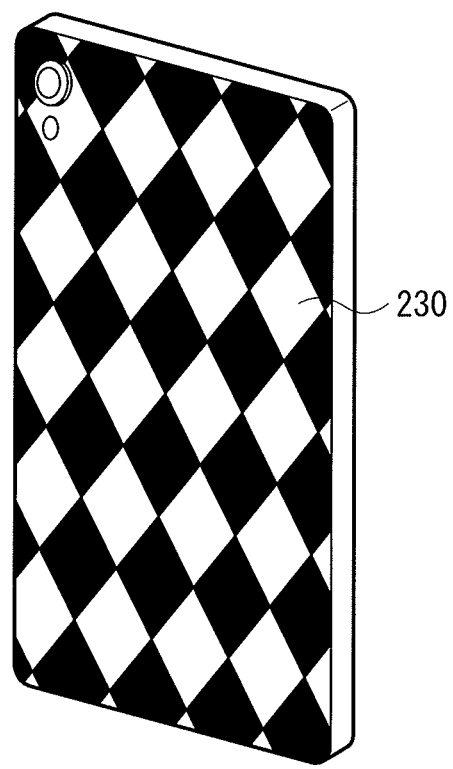

[ FIG. 7A ]
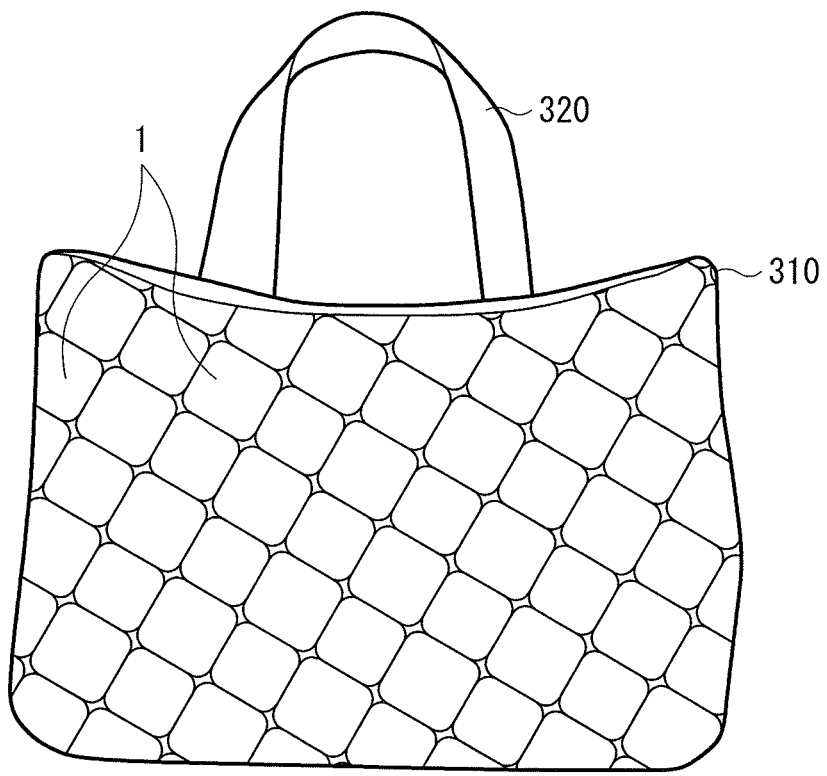
[ FIG. 7B ]

[ FIG. 8 ]
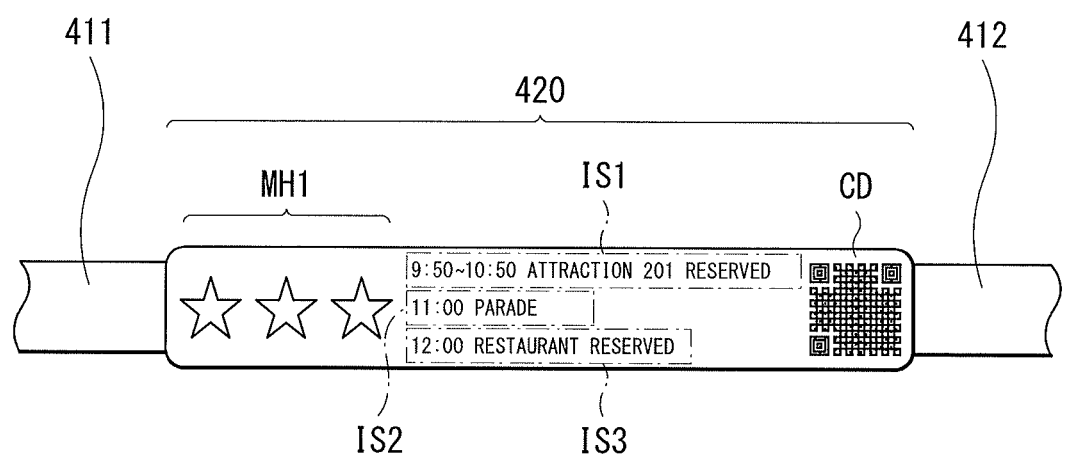

[ FIG. 9 ]
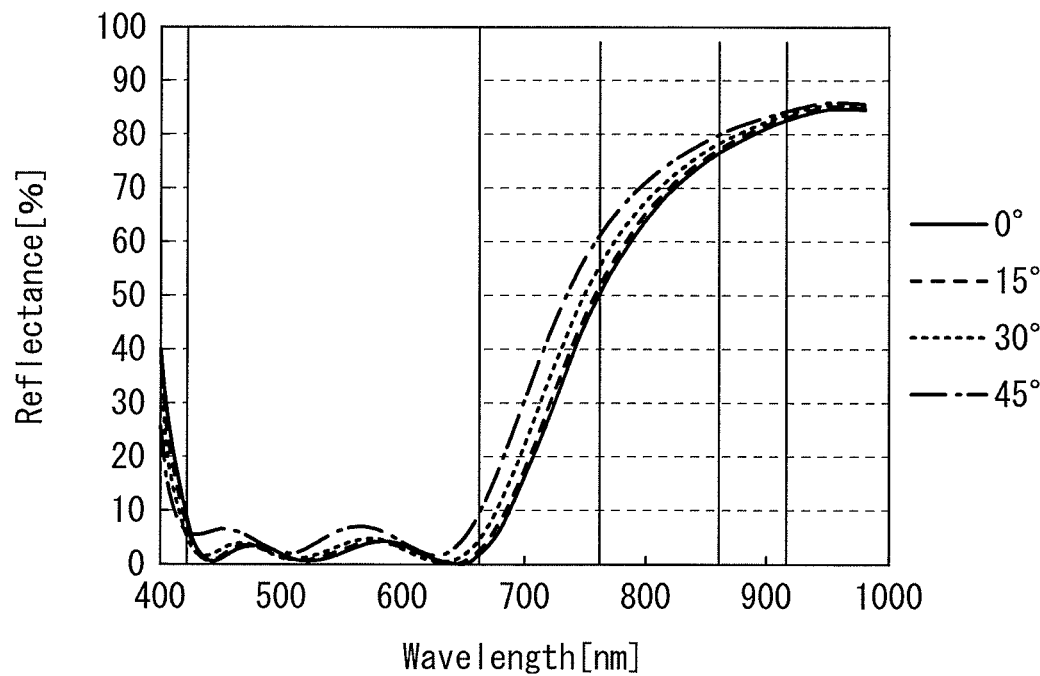
[ FIG. 10 ]
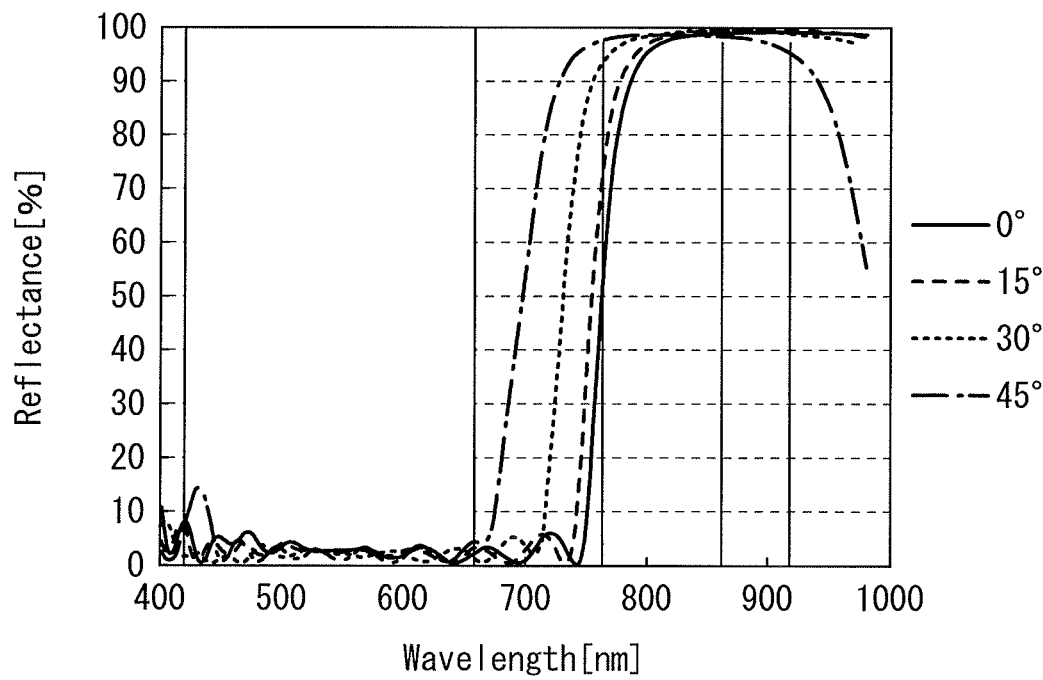

[ FIG. 11 ]
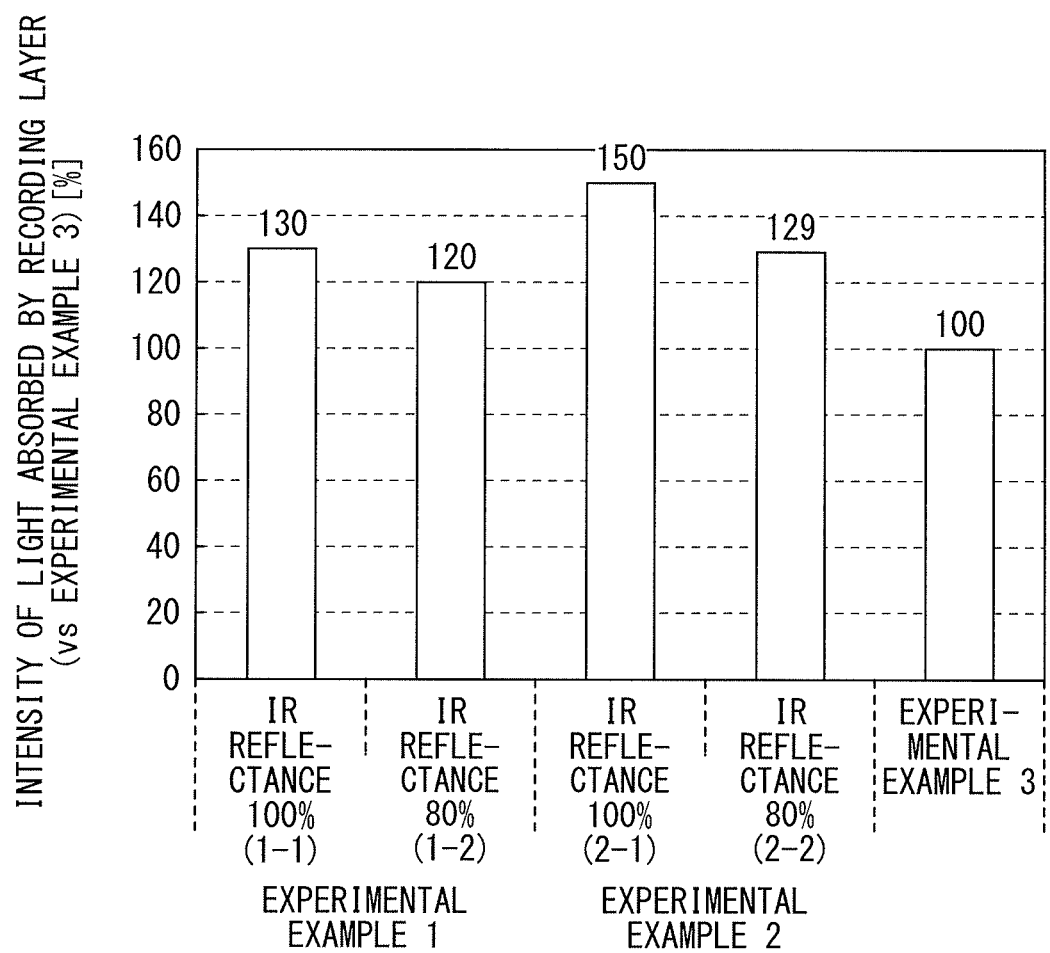

RECORDING MEDIUM, EXTERIOR MEMBER, AND METHOD OF RECORDING ON RECORDING MEDIUM

TECHNICAL FIELD

The present disclosure relates to, for example, a recording medium including a heat-sensitive color-developing composition, an exterior member including the recording medium, and a method of recording on the recording medium.

BACKGROUND ART

In recent years, a recording medium that includes a recording layer including a heat-sensitive color-developing composition and a photothermal conversion agent that absorbs an infrared ray has been developed. For example, Patent Literature 1 discloses a recording medium in which two or more recording layers are provided. The recording medium allows for multicolor display with use of heat-sensitive color-developing compositions and photothermal conversion agents. The heat-sensitive color-developing compositions each develop corresponding one of colors different from each other for corresponding recording layer. The photothermal conversion agents absorb respective infrared rays having wavelength different from each other. In the recording medium, application of infrared laser corresponding to the photothermal conversion agent included in each recording layer causes color development on the desired recording layer.

CITATION LIST

Patent Literature

PTL 1: Japanese Unexamined Patent Application Publication No. 2004-074584

SUMMARY OF THE INVENTION

By the way, it is requested to improve a recording speed and display quality of the recording medium described above.

It is desired to provide a recording medium, an exterior member, and a method of recording on a recording medium that allows for improvement of a recording speed and display quality.

A recording medium according to one embodiment of the present disclosure includes a recording layer and an optical thin film. The recording layer includes a heat-sensitive color-developing composition and a photothermal conversion material. The photothermal conversion material absorbs a wavelength in an infrared region and generating heat. The optical thin film is provided on one surface of the recording layer. The optical thin film reflects the wavelength in the infrared region and transmits a wavelength in a visible region.

An exterior member according to one embodiment of the present disclosure is provided with the recording medium according to one embodiment of the present disclosure at least on a decorated surface of a support base.

A method of recording on a recording medium according to one embodiment of the present disclosure includes irradiating a recording medium with light including at least a wavelength in an infrared region to perform drawing on a recording layer. The recording medium includes an optical thin film and the recording layer that are laminated in this order. The optical thin film reflects the wavelength in the infrared region and transmits a wavelength in a visible region, the recording layer including a heat-sensitive color-developing composition and a photothermal conversion material. The photothermal conversion material absorbs the wavelength in the infrared region and generating heat.

In the recording medium according to one embodiment of the present disclosure, the exterior member according to one embodiment, and the method of recording on the recording medium according to one embodiment, the optical thin film is provided on one surface side of the recording layer. The optical thin film reflects the wavelength in the infrared region and transmits the wavelength in the visible region. The recording layer includes the heat-sensitive color-developing composition and the photothermal conversion material absorbing the wavelength in the infrared region and generating heat. This makes it possible to improve efficiency of absorption of the wavelength in the infrared region in the recording layer.

According to the recording medium of one embodiment of the present disclosure, the exterior member of one embodiment, and the method of recording on the recording medium of one embodiment, the optical thin film is provided on one surface side of the recording layer. The optical thin film reflects the wavelength in the infrared region and transmits the wavelength in the visible region. This improves the efficiency of absorption of the wavelength in the infrared region in the recording layer. Therefore, it is possible to improve a recording speed and display quality.

Note that effects described here are not necessarily limited and any effect described in the present disclosure may be provided.

BRIEF DESCRIPTION OF DRAWINGS

FIG. 1 is a cross-sectional schematic diagram illustrating an example of a configuration of a recording medium according to a first embodiment of the present disclosure.

FIG. 2 is a schematic diagram for explaining an example of a method of recording on the recording medium illustrated in FIG. 1.

FIG. 3 is a schematic diagram for explaining another example of the method of recording on the recording medium illustrated in FIG. 1.

FIG. 4 is a cross-sectional schematic diagram illustrating an example of a configuration of a recording medium according to a second embodiment of the present disclosure.

FIG. 5A is a perspective diagram illustrating an example of an appearance of a first application example.

FIG. 5B is a perspective diagram illustrating another example of the appearance of the first application example.

FIG. 6A is a perspective diagram illustrating an example of an appearance (front surface side) of a second application example.

FIG. 6B is a perspective diagram illustrating an example of an appearance (back surface side) of the second application example.

FIG. 7A is a perspective diagram illustrating an example of an appearance of a third application example.

FIG. 7B is a perspective diagram illustrating another example of the appearance of the third application example.

FIG. 8 is an explanatory diagram illustrating one exemplary configuration of a fourth application example.

FIG. 9 is a characteristic diagram illustrating a relationship between a wavelength and a reflectance of $TiO_2$/AgBi (a five-layer film).

FIG. 10 is a characteristic diagram illustrating a relationship between a wavelength and a reflectance of $TiO_2/SiO_2$ (a fourteen-layer film).

FIG. 11 is a characteristic diagram illustrating a relationship between an intensity of light absorbed by a recording layer and an IR reflectance in each of experimental examples 1 to 3.

MODES FOR CARRYING OUT THE INVENTION

Embodiments of the present disclosure will be described below in detail with reference to the drawings. The following description is one specific example of the present disclosure, and the present disclosure is not limited to the following modes. Furthermore, arrangement, dimensions, dimension ratios, and the like of each component of the present disclosure are not limited to those illustrated in each drawing. Note that an order of the description is as follows.
1. First Embodiment (An example in which an optical thin film that reflects a wavelength in an infrared region and transmits a wavelength in a visible region is disposed below a recording layer)
   1-1. Configuration of Recording Medium
   1-2. Method of Manufacturing Recording Medium
   1-3. Method of Recording on Recording Medium
   1-4. Workings and Effects
2. Second Embodiment (An example including two or more recording layers)
   2-1. Configuration of Recording Medium
   2-2. Method of Recording on Recording Medium
   2-3. Workings and Effects
3. Application Examples
4. Examples

1. First Embodiment

FIG. 1 illustrates an example of a cross-sectional configuration of a recording medium (a recording medium 1) according to a first embodiment of the present disclosure. The recording medium 1 includes a recording layer (a recording layer 14) including a heat-sensitive color-developing composition and allows for recording by means of application of an infrared ray, for example. The recording medium 1 according to the present embodiment has a configuration in which an optical thin film 13 is provided on one surface of the recording layer 14. The optical thin film 13 reflects a wavelength in an infrared region and transmits a wavelength in a visible region. Note that, FIG. 1 schematically illustrates the cross-sectional configuration of the recording medium 1, and may differ from actual dimensions and shapes.

(1-1. Configuration of Recording Medium)

The recording medium 1 according to the present embodiment includes the optical thin film 13 and the recording layer 14 laminated in this order. For example, the optical thin film 13 and the recording layer 14 are disposed on a support base 11 with an adhesive layer 12 in between. Furthermore, for example, a protection film 15 is formed on the recording layer 14.

The support base 11 is directed to supporting of the recording layer 14. The support base 11 includes a material having excellent heat resistance and having excellent dimension stability in a planar direction. The support base 11 may have either of optical transparency or non-optical transparency. The support base 11 may be, for example, a rigid substrate such as a wafer or may include flexible thin glass, a film, paper, or the like. By using a flexible substrate as the support base 11, it is possible to achieve a flexible (foldable) recording medium.

Examples of a material included in the support base 11 include an inorganic material, a metal material, a polymer material such as plastic, and the like. Specifically, examples of the inorganic material include silicon (Si), silicon oxide (SiOx), silicon nitride (SiNx), aluminum oxide (AlOx), magnesium oxide (MgOx), and the like. The silicon oxide includes, glass, spin-on-glass (SOG), or the like. Examples of the metal material include single metal such as aluminum (Al), copper (Cu), silver (Ag), gold (Au), platinum (Pt), palladium (Pd), nickel (Ni), tin (Sn), cobalt (Co), rhodium (Rh), iridium (Ir), iron (Fe), ruthenium (Ru), osmium (Os), manganese (Mn), molybdenum (Mo), tungsten (W), niobium (Nb), tantalum (Ta), titanium (Ti), bismuth (Bi), antimony (Sb), lead (Pb), and the like or an alloy including two or more kinds of these. Specific examples of the alloy include stainless steel (SUS), an aluminum alloy, a magnesium alloy, a titanium alloy, and the like. Examples of the polymer material include a phenolic resin, an epoxy resin, a melamine resin, a urea resin, an unsaturated polyester resin, an alkyd resin, an urethane resin, polyimide, polyethylene, high-density polyethylene, medium-density polyethylene, low-density polyethylene, polypropylene, polyvinyl chloride, polyvinylidene chloride, polystyrene, polyvinyl acetate, polyurethane, an acrylonitrile butadiene styrene resin (ABS), an acrylic resin (PMMA), polyamide, nylon, polyacetal, polycarbonate (PC), modified-polyphenyleneether, polyethylene terephthalate (PET), polybutylene terephthalate, cyclic polyolefin, polyphenylene sulfide, polytetrafluoroethylene (PTFE), polysulfone, polyether sulfone, amorphous polyarylate, liquid crystal polymer, polyetheretherketone (PEEK), polyamide-imide, polyethylene naphthalate (PEN), triacetylcellulose, cellulose, a copolymer of those, glass fiber reinforced plastic, carbon fiber reinforced plastic (CFRP), and the like.

The adhesive layer 12 is directed to fixing of the recording medium 1 on the support base 11. As a material of the adhesive layer 12, for example, it is possible to use general-purpose adhesive agent and an adhesive tape. Specifically, examples thereof include acrylic adhesive (adhesive agent), epoxy adhesive, siloxane adhesive, urethane adhesive, silane coupling agent, natural rubber adhesive, synthetic rubber adhesive, and the like.

As described above, the optical thin film 13 reflects at least a portion of wavelengths in an infrared region and transmits wavelengths in a visible region. The optical thin film 13 has, for example, a configuration in which two kinds of thin films, having optical transparency and having different refractive indices, are alternately laminated. Examples of a material of the two kinds of thin films include a metal film including Mg, Al, Hf, Nb, Zr, Sc, Ta, Ga, Zn, Y, B, Ti, or Ag, an oxide film, a nitride film, an oxynitride film, or the like. Specifically, examples of the metal film include Ag, AgBi, Al, and the like. Examples of the oxide film, the nitride film, or the oxynitride film include $SiO_2$, $TiO_2$, $Nb_2O_5$, $ZrO_2$, $Ta_2O_5$, $ZnO$, $Al_2O_3$, $HfO_2$, $Si_3N_4$, and the like. As a combination of the above materials, it is preferable to alternately laminate a thin film including a high-refractive index material such as $TiO_2/AgBi$ or $TiO_2/SiO_2$ and a thin film including a low-refractive index material. This makes it possible to obtain a high optical reflectance.

The recording layer 14 allows for recording of information by means of heat and includes a heat-sensitive color-developing composition and a photothermal conversion material. The photothermal conversion material absorbs the wavelength in the infrared region and generates heat. The recording layer 14 includes, for example, a material that allows for repetitive stable recording and allows for control of a decolored state and a colored state as the heat-sensitive color-developing composition. As an example, the recording layer 14 is formed by using, for example, a polymer material including a coloring compound, a developing/reducing agent, and a photothermal conversion material. A thickness of the recording layer 14 is, for example, equal to or more than 1 μm and equal to or less than 10 μm.

Examples of the coloring compound include a leuco dye. Examples of the leuco dye include an existing dye for thermosensitive paper. Specifically, examples thereof include a compound that includes, for example, an electron-donating radical in a molecule indicated in the following Formula (1).

[Chem. 1]

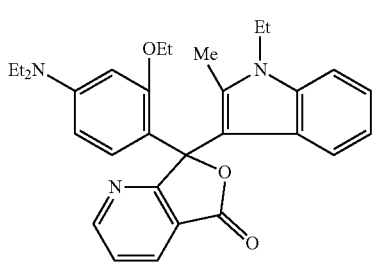

(1)

The developing/reducing agent is directed to, for example, coloring of a colorless coloring compound or decoloring of a coloring compound that is colored in a predetermined color. Examples of the developing/reducing agent include a compound that has a salicylic acid skeleton indicated in the following general formula (2) and includes a radical having electron acceptability in a molecule.

[Chem. 2]

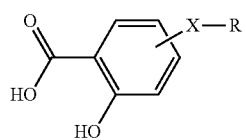

(2)

(X is any one of —NHCO—, —CONH—, —NHCONH—, —CONHCO—, —NHNHCO—, —CONHNH—, —CONHNHCO—, —NHCOCONH—, —NHCONHCO—, —CONHCONH—, —NHNHCONH—, —NHCONHNH—, —CONHNHCONH—, —NHCONHNHCO—, and —CONHNHCONH—. R indicates a linear hydrocarbon group having carbon number that is equal to or more than 25 and equal to or less than 34).

For example, the photothermal conversion material absorbs light in a predetermined wavelength band in a near infrared ray region and generates heat. As the photothermal conversion material, it is preferable to use a near infrared ray absorbing a dye that, for example, has an absorption peak in a range of a wavelength equal to or more than 700 nm and equal to or less than 2000 nm and performs almost no absorption in a visible region. Specifically, examples thereof include a compound having a phthalocyanine skeleton (phthalocyanine dyes), a compound having a squarylium skeleton (squarylium dyes), and, for example, an inorganic compound, and the like. Examples of the inorganic compound include a metallic complex such as a dithio complex, diimonium salt, aminium salt, an inorganic compound, and the like. Examples of the inorganic compound include metallic oxide such as graphite, carbon black, metal powder particles, tricobalt tetroxide, iron oxide, chromic oxide, copper oxide, titanium black, ITO, and the like, metallic nitride such as niobium nitride, metallic carbide such as tantalum carbide, metallic sulfide, various magnetic powders, and the like. In addition, a compound that has a cyanine skeleton having excellent light resistance and excellent heat resistance (cyanine dyes) may be used.

Note that, here, the excellent light resistance indicates that decomposition does not occur at the time of laser irradiation. The excellent heat resistance indicates, for example, that the maximum absorption peak value of an absorption spectrum does not vary by 20% or more when it is deposited with a polymer material and is kept at 150° C. for 30 minutes, for example. Examples of a compound having such a cyanine skeleton includes a compound including, in a molecule, any one of counter ions such as $SbF_6$, $PF_6$, $BF_4$, $ClO_4$, $CF_3SO_3$, and $(CF_3SO_3)_2N$, a methine chain having a five-membered ring or a six-membered ring, or both. Note that it is preferable that a compound having a cyanine skeleton used for a reversible recording medium according to the present embodiment include both of the counter ion described above and an annular structure such as the five-membered ring or the six-membered ring in the methine chain. However, if at least one of the above is included, sufficient light resistance and sufficient heat resistance are secured.

It is preferable to use the polymer material that allows the coloring compound, the developing/reducing agent, and the photothermal conversion material to be uniformly and easily dispersed. The polymer material includes, for example, a thermoset resin and a thermoplastic resin. Specifically, examples thereof include polyvinyl chloride, polyvinyl acetate, vinyl-chloride-vinyl-acetate copolymer, ethyl cellulose, polystyrene, styrene copolymer, a phenoxy resin, polyester, aromatic polyester, polyurethane, polycarbonate, polyacrylic acid ester, polymethacrylic acid ester, acrylic acid copolymer, maleic acid polymer, polyvinyl alcohol, modified polyvinyl alcohol, hydroxyethyl cellulose, carboxymethyl cellulose, starch, and the like.

The recording layer 14 includes at least one kind of the coloring compound, at least one kind of the developing/reducing agent, and at least one kind of the photothermal conversion material described above as the heat sensitive color developing composition. It is preferable to use the coloring compound and the developing/reducing agent, for example, at the coloring compound: the developing/reducing agent=1:2 (ratio by weight). The photothermal conversion material changes depending on the film thickness of the recording layer 14. Furthermore, the recording layer 14 may include, for example, various additives such as a sensitizer, an ultraviolet ray absorber, or the like, in addition to the above materials.

For example, it is preferable to form the protection film 15 on the recording layer 14. The protection film 15 is directed to protection of the surface of the recording layer 14 and is formed by using, for example, an ultraviolet-curing resin, a thermosetting resin, or the like. A thickness of the protection film 15 is, for example, equal to or more than 0.1 μm and equal to or less than 20 μm.

(1-2. Method of Manufacturing Recording Medium)

It is possible to manufacture the recording medium 1 according to the present embodiment, for example, by using a coating method. Note that a manufacturing method to be described below is an example, and the recording medium 1 may be manufactured by using any other method.

First, for example, a vinyl-chloride-vinyl-acetate copolymer as a polymer material is dissolved in a solvent (for example, methyl ethyl keton). The developing/reducing agent, the coloring compound, and the photothermal conversion material are added to and dispersed in this solution. This provides a coating material for a recording medium. Subsequently, the coating material for a recording medium is applied, with a thickness of 3 μm, on a temporary substrate, for example, and is dried, for example, at 70° C., to form the recording layer 14. Next, the optical thin film 13 is formed by alternately forming a $TiO_2$ film and an AgBi film on the recording layer 14, for example, by using a film forming method such as sputtering deposition, vapor deposition, or the like. Subsequently, after forming the adhesive layer 12 on the optical thin film 13, those are bonded at a predetermined position of the support base 11. Lastly, for example, an acrylic resin is applied, for example, with a thickness of 10 μm on the recording layer 14 fixed on the support base 11, and thereafter, the applied acrylic resin is dried to form the protection film 15. This completes the recording medium 1 illustrated in FIG. 1.

Note that the recording layer 14 may be formed by using a method other than the transfer method described above. For example, the recording layer 14 may be formed by applying a prepared coating material for a recording medium on the optical thin film 13 after forming the optical thin film 13 on the support base 11. The protection film 15 is formed on the recording layer 14. This completes the recording medium 1 illustrated in FIG. 1.

(1-3. Method of Recording on Recording Medium)

In the recording medium 1 according to the present embodiment, it is possible to perform recording, for example, as follows.

FIG. 2 is directed to describing of a method of recording on the recording medium 1 illustrated in FIG. 1. First, a reflection-type polarizer 32 is placed on the recording medium 1. Next, the recording layer 14 is heated at a temperature at which the coloring compound is decolored, for example, at the temperature of 120° C., and is set to be in a decolored state in advance. Subsequently, a predetermined position of the recording layer 14 is irradiated with a near infrared ray having a prepared wavelength and a prepared output, for example, from a semiconductor laser 31. Thereby, the photothermal conversion material included in the recording layer 14 generates heat, and a color reaction (a color development reaction) occurs between the coloring compound and the developing/reducing agent, causing an irradiated portion to develop a color.

The method of recording on the recording medium 1 according to the present embodiment improves light absorption by the recording layer 14 by multiply reflecting laser light (Li) between the optical thin film 13 and the reflection-type polarizer 32 and repeatedly making the laser light enter the recording layer 14. The reflection-type polarizer 32 reflects a large portion of linearly-polarized light Lr and transmits a large portion of linearly-polarized light Lt orthogonal to the linearly-polarized light Lr. By disposing a polarization direction of the laser light Li and a transmission axis direction of the reflection-type polarizer 32 (an X-axis direction in FIG. 2) to match each other, the reflection-type polarizer 32 selectively reflects a polarization component in a perpendicular direction (Y-axis direction) of the light reflected by the optical thin film 13 and causes the reflected light to enter the recording medium 1 again.

Note that, in FIG. 2, an example is illustrated in which the reflection-type polarizer 32 is placed on the recording medium 1. However, it is not necessary to place the reflection-type polarizer 32. Also in a case where the reflection-type polarizer 32 is not placed, the laser light (Li) that is not absorbed by the recording layer 14 is reflected by the optical thin film 13, enters the recording layer 14 again, and is absorbed by the recording layer 14. This makes it possible to improve light absorption efficiency of the recording layer 14.

Moreover, a retarder 33 may be disposed between the recording medium 1 and the reflection-type polarizer 32 as illustrated in FIG. 3. When the light Li reflected by the recording medium 1 enters the reflection-type polarizer 32, it is preferable that a half of polarization components pass through the reflection-type polarizer 32 and the other half of the polarization components be reflected by the reflection-type polarizer 32. However, a phase difference amount (retardation) of the recording medium 1 is almost zero, or it is not possible to manage the retardation of the recording medium 1. Therefore, by disposing an appropriate retarder 33 between the recording medium 1 and the reflection-type polarizer 32, it is possible to cause a polarization state of the light Li reflected by the recording medium 1 to be appropriate.

For example, in a case where the retardation of the recording medium 1 is almost zero, it is preferable that a phase difference amount of the retarder 33 be set to $\lambda/8$ and the retarder 33 be disposed to cause a slow axis direction of the retarder 33 to have an angle of 45° (or 135°) with respect to the transmission axis of the reflection-type polarizer 32. With this arrangement, since the light exiting from the retarder 33 becomes circularly-polarized light, a half of the light is reflected by the reflection-type polarizer 32 and enters the recording medium 1 again.

However, in a case where the recording medium 1 itself has the retardation, it is difficult to set an appropriate polarization state by the above method. In this case, it is preferable to select a retarder having a large retardation as the retarder 33. As the retarder having a large retardation, for example, it is preferable to use a crystal having an optical birefringence. For example, when calcite having $\Delta n=0.1$ and a thickness of 7.5 mm is disposed, it is possible to change the polarization state for each wavelength, and it is easy to divide the polarization components of the light Li entering the reflection-type polarizer 32 into a half that passes through the reflection-type polarizer 32 and a half that is reflected by the reflection-type polarizer 32.

Note that, as described above, in a case where the recording layer 14 is formed by using the polymer material including the coloring compound, the developing/reducing agent, and the photothermal conversion material, it is possible to delete, by using the following method, information drawn on the recording layer 14 by using the above method.

In a case where a colored portion is to be decolored, the colored portion is irradiated with a near infrared ray with energy that makes the temperature reach a decoloring temperature. Thereby, the photothermal conversion material included in the recording layer 14 generates heat, and a decolor reaction occurs between the coloring compound and the developing/reducing agent. The color developed on the irradiated portion is decolored, and the record is deleted. Furthermore, in a case where all the records formed on the recording layer 14 are collectively deleted, the recording medium 1 is heated at a temperature that allows for decoloring, for example, 120° C. Thereby, the information recorded on the recording layer 14 is collectively deleted. In this way, the use of, for example, the leuco dye as the heat-sensitive color-developing composition allows for reversible change between a recording state and a deleting state. Thereafter, by performing the above operation, it is possible to repeatedly perform recording on the recording layer 14.

Note that, as long as the color reaction and the decolor reaction such as the irradiation of the near infrared ray, heating, or the like are not caused, the colored state or the decolored state is kept.

(1-4. Workings and Effects)

As described above, the recording medium that includes the heat-sensitive color-developing composition and the photothermal conversion agent that absorbs an infrared ray has been developed. The recording medium including the two or more recording layers that develop respective colors different from each other has been developed. In this recording medium, photothermal conversion agents that absorb respective infrared rays having wavelengths different from each other are used for the respective recording layers.

By the way, there are many cases where the photothermal conversion agent that is used for the recording medium described above and absorbs the infrared ray also absorbs a wavelength other than the infrared ray. For example, the photothermal conversion agent slightly absorbs the wavelength in the visible region. For example, in a case where the recording medium is used as an exterior member of a housing of an electronic apparatus or the like, a region other than a colored region appears to be slightly blackened due to the absorption of the visible region. Therefore, in order to improve display quality of the recording medium, it is desirable to reduce an amount of the photothermal conversion agent. On the other hand, in order to improve a recording speed of the recording medium described above, it is considered to use more photothermal conversion agents to allow for efficient absorption of the infrared rays and conversion of the absorbed infrared rays into heat. As described above, there has been a problem that photothermal conversion efficiency and the display quality of the recording medium have a trade-off relationship.

In view of this, in the present embodiment, the optical thin film 13 is provided on one surface of the recording layer 14 including the heat-sensitive color-developing composition, specifically, between the support base 11 and the recording layer 14. The optical thin film 13 reflects the wavelength in the infrared region and transmits the wavelength in the visible region. Thereby, at the time of recording on the recording layer 14, for example, the infrared ray Li applied from the semiconductor laser 31 is reflected, and the reflected infrared ray Li is absorbed by the recording layer 14 again. This makes it possible to improve efficiency of absorption of the infrared rays Li in the recording layer 14 without increasing a content of the photothermal conversion material.

As described above, in the recording medium 1 according to the present embodiment, the optical thin film 13 is disposed below the recording layer 14, specifically, on opposite side to the surface irradiated with the laser light Li at the time of recording. The optical thin film 13 reflects the wavelength in the infrared region and transmits the wavelength in the visible region. Therefore, the efficiency of absorption of the infrared rays Li in the recording layer 14 is improved without increasing the content of the photothermal conversion material. Accordingly, it is possible to improve the speed of recording on the recording medium 1 and the display quality of the recording medium 1.

Furthermore, in the present embodiment, the reflection-type polarizer 32 is disposed on the recording medium 1 at the time of recording on the recording medium 1. Therefore, the infrared ray is multiply reflected between the optical thin film 13 and the reflection-type polarizer 32. This makes it possible to further improve the efficiency of absorption of the infrared rays Li in the recording layer 14.

Next, a second embodiment of the present disclosure will be described. Hereinafter, a component similar to that in the first embodiment is denoted with the same reference numeral, and description thereof is appropriately omitted.

2. Second Embodiment

FIG. 4 illustrates a cross-sectional configuration of a recording medium (a recording medium 2) according to a second embodiment of the present disclosure. As in the first embodiment described above, in the recording medium 2, for example, an optical thin film 13, a recording layer 24, and a protection film 15 are laminated in this order on a support base 11. In the present embodiment, it has a configuration in which a diffuse reflection layer 26 is further provided between the support base 11 and the optical thin film 13, for example, directly on the support base 11. The diffuse reflection layer 26 reflects and diffuses a wavelength in a visible region. Furthermore, in the recording medium 2 according to the present embodiment, for example, three layers (recording layers 24M, 24C, and 24Y) are laminated in this order as the recording layer 24, and heat insulating layers 27 and 28 are provided in respective regions between the recording layers 24M, 24C, and 24Y. Note that FIG. 2 schematically illustrates the cross-sectional configuration of the recording medium 1, and may differ from actual dimensions and shapes.

(2-1. Configuration of Recording Medium)

The diffuse reflection layer 26 is directed to diffusing and reflecting of the wavelength in the visible region as described above. The diffuse reflection layer 26 includes, for example, a resin material. Although a thickness of the diffuse reflection layer 26 is not particularly limited, the thickness is, for example, several micrometers to several tens of micrometers. Note that it is not necessary to provide the diffuse reflection layer 26 directly on the support base 11. As long as the diffuse reflection layer 26 is provided in a layer lower than the optical thin film 13, for example, the diffuse reflection layer 26 may be provided immediately below the optical thin film 13.

The recording layer 24 allows for recording of information by means of heat and includes a heat-sensitive color-developing composition. The recording layer 24 includes, for example, a material that allows for repetitive stable recording and allows for control of a decolored state and a colored state as the heat-sensitive color-developing composition. The recording layer 24 has a configuration, for example, in which the recording layers 24M, 24C, and 24Y are laminated in this order from side of the support base 11 as described above. As an example, each of the recording layers 24M, 24C, and 24Y is formed by using, for example, a polymer material including a coloring compound that causes corresponding one of colors different from each other to appear, a developing/reducing agent corresponding to the coloring compound, and a photothermal conversion material that absorbs light in corresponding one of wavelengths different from each other and generates heat.

Specifically, the recording layer 24M includes, for example, a coloring compound that develops a color of magenta, a developing/reducing agent corresponding thereto, and a photothermal conversion material that absorbs an infrared ray having, for example, a wavelength $\lambda_1$. The recording layer 24C includes, for example, a coloring compound that causes a color of cyan to appear, a developing/reducing agent corresponding thereto, and a photothermal conversion material that absorbs an infrared ray having, for example, a wavelength $\lambda_2$ and generates heat. The recording layer 24Y includes, for example, a coloring compound that causes a color of yellow to appear, a developing/reducing agent corresponding to the coloring compound, and a photothermal conversion material that absorbs an infrared ray having, for example, a wavelength $\lambda_3$ and generates heat. This makes it possible to obtain a display medium that allows for multicolor display.

Note that, for the photothermal conversion material, it is preferable to select a combination of materials having narrow light absorption bands that are, for example, in a range of a wavelength equal to or more than 700 nm and equal to or less than 2000 nm and that do not overlap with each other. This makes it possible to selectively perform coloring or decoloring of a desired layer of the recording layers 24M, 24C, and 24Y.

The thickness of each of the recording layers 24M, 24C, and 24Y is preferably, for example, equal to or more than 1 μm and equal to or less than 20 μm, and more preferably, for example, equal to or more than 2 μm and equal to or less than 15 μm. One reason for this is that, when the thickness of each of the recording layers 24M, 24C, and 24Y is less than 1 μm, there is a possibility that a sufficient coloring density is not obtained. Furthermore, one reason for this is that, in a case where the thickness of each of the recording layers 24M, 24C, and 24Y is thicker than 20 μm, a heat utilization amount of each of the recording layers 24M, 24C, and 24Y increases, and there is a possibility that a coloring property and a decoloring property are deteriorated.

Furthermore, similarly to the recording layer 14 described above, the recording layers 24M, 24C, and 24Y may include, for example, various additives such as a sensitizer or an ultraviolet ray absorber, in addition to the above materials.

Moreover, in the recording layer 24 in the present embodiment, heat insulating layers 27 and 28 are respectively provided between the recording layers 24M and 24C and between the recording layers 24C and 24Y. The heat insulating layers 27 and 28 include a polymer material having, for example, general translucency. Examples of a specific material include polyvinyl chloride, polyvinyl acetate, vinyl-chloride-vinyl-acetate copolymer, ethyl cellulose, polystyrene, styrene copolymer, a phenoxy resin, polyester, aromatic polyester, polyurethane, polycarbonate, polyacrylic acid ester, polymethacrylic acid ester, acrylic acid copolymer, maleic acid polymer, polyvinyl alcohol, modified polyvinyl alcohol, hydroxyethyl cellulose, carboxymethyl cellulose, starch, and the like. Note that the heat insulating layers 27 and 28 may include, for example, various additives such as an ultraviolet ray absorber or the like.

Furthermore, the heat insulating layers 27 and 28 may be formed by using an inorganic material having translucency. For example, when porous silica, alumina, titania, carbon, a complex of these, or the like is used, a thermal conductance is lowered, and a heat insulation effect is high, which is preferable. It is possible to form the heat insulating layers 27 and 28, for example, by the sol-gel method.

A thickness of each of the heat insulating layers 27 and 28 is preferably, for example, equal to or more than 3 and equal to or less than 100 μm, and more preferably, for example, equal to or more than 5 μm and equal to or less than 50 μm. One reason for this is that, when the thickness of each of the heat insulating layers 27 and 28 is too thin, a sufficient heat insulation effect is not obtained, and when the thickness is too thick, a thermal conductivity is deteriorated and the translucency is lowered when the entire recording medium 2 is uniformly heated.

(2-2. Method of Recording on Recording Medium)

It is possible to perform recording and deleting as follows in the recording medium 2 according to the present embodiment, for example. Note that, here, a case where the recording layers 24M, 24C, and 24Y respectively colored in magenta, cyan, and yellow described above are laminated in the recording layer 24 will be described as an example.

First, the recording layer 24 (the recording layers 24M, 24C, and 24Y) is heated at a temperature at which the recording layer 24 is decolored, for example, 120° C. and is set to be in a decolored state in advance. Next, any portion of the recording layer 24 is irradiated with an infrared ray having a wavelength and an output freely selected, for example, by a semiconductor laser or the like. Here, in a case where the recording layer 24M is caused to develop a color, the infrared ray having the wavelength $\lambda_1$ is applied with energy that makes the temperature of the recording layer 24M reach a coloring temperature. Thereby, the photothermal conversion material included in the recording layer 24M generates heat, a color reaction (a color development reaction) occurs between the coloring compound and the developing/reducing agent, and the irradiated portion develops the color of magenta. Similarly, in a case where the recording layer 24C is caused to develop a color, the infrared ray having the wavelength $\lambda_2$ is applied with energy that makes the temperature of the recording layer 24C reach a coloring temperature. In a case where the recording layer 24Y is caused to develop a color, the infrared ray having the wavelength $\lambda_3$ is irradiated with energy that makes the temperature of the recording layer 24Y reach a coloring temperature. Thereby, the photothermal conversion materials included in the recording layers 24C and 24Y generate heat, a color reaction occurs between the coloring compound and the developing/reducing agent, and the irradiated portions respectively develop the colors of cyan and yellow. In this way, irradiating any portion with the infrared ray having the corresponding wavelength makes it possible to record information (for example, a full-color image).

In contrast, in a case where the recording layers 24M, 24C, and 24Y that have developed the colors as described above are decolored, the respective recording layers 24M, 24C, and 24Y are irradiated with infrared rays having wavelengths corresponding to the respective recording layers 24M, 24C, and 24Y with energy that makes the temperature reach a decoloring temperature. Thereby, the photothermal conversion material included in each of the recording layers 24M, 24C, and 24Y generates heat, a decoloring reaction occurs between the coloring compound and the developing/reducing agent, the developed color of the irradiated portion is decolored, and the record is deleted. Furthermore, in a case where all the records formed on the recording layer 24 are to be collectively deleted, information recorded on the recording layer 24 (the recording layers 24M, 24C, and 24Y) is collectively deleted by heating the recording layer 24 at a temperature that allows for decoloring of all the recording layers 24M, 24C, and 24Y, for example, 120° C. Thereafter, by performing the above operation, it is possible to repeatedly perform recording on the recording layer 24.

(2-3. Workings and Effects)

In the recording medium 2 according to the present embodiment, the diffuse reflection layer 26 that reflects and diffuses the wavelength in the visible region is provided between the support base 11 and the optical thin film 13. Thereby, in addition to the effect in the first embodiment described above, an effect is obtained that makes it possible to visually recognize information written on the recording layer 24 from various directions, for example, an oblique direction, in addition to a direction toward the front side.

Furthermore, in the present embodiment, for example, the three layers (the recording layers 24M, 24C, and 24Y) respectively including the coloring compounds that make magenta, cyan, and yellow appear, the corresponding developing/reducing agents, and the photothermal conversion materials that have absorption wavelengths different from each other as the heat-sensitive color-developing compositions are formed and laminated. This makes it possible to provide a recording medium that allows for multicolor recording.

3. Application Example

Next, for example, application examples of the recording medium (the recording media 1 and 2) described above in the first and second embodiments will be described. However, a configuration of an electronic apparatus to be described below is merely an example, and it is possible to appropriately change the configuration. It is possible to apply any of the recording media 1 and 2 described above to a portion of various electronic apparatuses or an accessory. For example, it is applicable to a portion of an accessory such as a clock (watch), a bag, clothes, a hat, glasses, and shoes as, for example, a so-called wearable terminal. The kind of the electric apparatus and the like is not particularly limited. Furthermore, in addition to the electric apparatuses and the accessories, it is possible to apply it to interior and exterior decoration such as a wall of a building, and exterior decoration or the like of furniture such as a desk, for example.

First Application Example

FIGS. 5A and 5B illustrate an appearance of an Integrated Circuit (IC) card having a rewrite function. A surface of the IC card is a print surface 110 (decorated surface), and for example, a sheet-like recording medium 1 or the like is bonded thereto. By disposing the recording medium 1 or the like on the print surface 110 of the IC card, it is possible to appropriately perform drawing, rewriting, and deleting on the print surface as illustrated in FIGS. 5A and 5B.

Second Application Example

FIG. 6A illustrates an appearance configuration of a front surface of a smartphone, and FIG. 6B illustrates an appearance configuration of a back surface of the smartphone illustrated in FIG. 6A. The smartphone includes, for example, a display 210, a non-display 220, and a housing 230. For example, on one surface of the housing 230 on the back surface side, for example, the recording medium 1 or the like is provided as an exterior member of the housing 230. This makes it possible to display various colors and patterns as illustrated in FIG. 6B. Note that, here, the smartphone has been described as an example. However, the application example is not limited to this, and for example, it is possible to apply it to a laptop personal computer (PC), a tablet PC, or the like.

Third Application Example

FIGS. 7A and 7B illustrate an appearance of a bag. The bag includes, for example, a containing portion 310 and a handle 320. For example, the recording medium 1 is attached to the containing portion 310, for example. On the containing portion 310, various characters and patterns are displayed, for example, by the recording medium 1. Furthermore, it is possible to display various colors and patterns by attaching the recording medium 1 or the like to the handle 320 portion, and it is possible to change the design of the containing portion 310 as in the examples in FIGS. 7A and 7B. It is possible to achieve an electronic device that is useful for fashion applications.

Fourth Application Example

FIG. 8 illustrates an exemplary configuration of a wristband on which, for example, an attraction boarding history, schedule information, or the like is allowed to be recorded, for example, in an amusement park. The wristband includes belts 411 and 412 and an information recorder 420. Each of the belts 411 and 412 has, for example, a band-like shape, and ends (not illustrated) are configured to be couplable to each other. For example, the recording medium 1 or the like is bonded to the information recorder 420, and in addition to a boarding history MH2 of the attraction and schedule information IS (IS1 to IS3) described above, for example, an information code CD is recorded thereon. In the amusement park, it is possible to record the information described above by holding the wristband over drawing units placed in various places such as an attraction boarding reservation spot or the like by a visitor.

A boarding history mark MH1 indicates the number of attractions on which the visitor who wears the wristband has boarded in the amusement park. In this example, as the number of attractions on which the visitor has boarded is larger, more star marks are recorded as the boarding history marks MH1. Note that this is non-limiting, and for example, a color of the mark may be changed depending on the number of attractions on which the visitor has boarded.

The schedule information IS indicates a schedule of a visitor in this example. In the example, information regarding all events including an event reserved by the visitor and an event held in the amusement park is recorded as the schedule information IS1 to IS3. Specifically, in this example, a name of the attraction (an attraction 201) of which a boarding reservation is made by the visitor and a scheduled boarding time are recorded as the schedule information IS1. Furthermore, an event in the park such as a parade and a scheduled starting time are recorded as the schedule information IS2. Furthermore, a restaurant reserved by the visitor 5 in advance and a scheduled meal-time are recorded as the schedule information IS3.

In the information code CD, for example, identification information IID used to identify the wristband and website information IWS are recorded.

4. Examples

Next, Examples of the present disclosure will be described in detail.

Experiment 1: Evaluation of Characteristic of Optical Thin Film

A sample of an optical thin film reflecting a wavelength in an infrared region and transmitting a wavelength in a visible region was fabricated, and a characteristic thereof was evaluated. First, a lamination film ($TiO_2$/AgBi) in which titanium oxide films and silver bismuth films were alternately laminated was fabricated as a sample 1. A lamination film ($TiO_2$/$SiO_2$) in which titanium oxide films and silicon oxide films were alternately laminated was fabricated as a sample 2. Optical characteristics of the samples 1 and 2 were evaluated.

Tables 1 and 2 are respectively summaries of lamination structures and film thicknesses of the sample 1 (Table 1) and the sample 2 (Table 2). Each of FIGS. 9 and 10 illustrates a relationship between a wavelength and a reflectance of corresponding one of the sample 1 (FIG. 9) and the sample 2 (FIG. 10). It was found that both of the sample 1 having a five-layer film structure of $TiO_2$/AgBi and the sample 2 having a fourteen-layer film structure of $TiO_2$/$SiO_2$ have a small reflectance with respect to visible light and have a high reflectance with respect to the infrared ray at an angle of incidence (0° to 45°) in a wide range at a certain degree. Furthermore, since the sample 2 had a larger total number of lamination films than the sample 1, it was possible to confirm steep variation in the reflectance between the visible light and the infrared ray.

TABLE 1

|  | Thickness (nm) |
| --- | --- |
| $TiO_2$ | 141 |
| AgBi | 9 |
| $TiO_2$ | 64 |
| AgBi | 17 |
| $TiO_2$ | 32 |

TABLE 2

|  | Thickness (nm) |
| --- | --- |
| $TiO_2$ | 100 |
| $SiO_2$ | 174 |
| $TiO_2$ | 92 |
| $SiO_2$ | 164 |
| $TiO_2$ | 91 |
| $SiO_2$ | 161 |
| $TiO_2$ | 91 |
| $SiO_2$ | 160 |
| $TiO_2$ | 92 |
| $SiO_2$ | 161 |
| $TiO_2$ | 94 |
| $SiO_2$ | 167 |
| $TiO_2$ | 92 |
| $SiO_2$ | 81 |

Experiment 2: Evaluation of Intensity of Light Absorbed by Recording Layer

An intensity of light absorbed by a recording layer of a recording medium was simulated. The recording medium included an optical thin film corresponding to the diffuse reflection layer 26 in the second embodiment, an adhesive layer, an optical thin film corresponding to the optical thin film 13 according to the first embodiment, a recording layer developing a color of magenta, a heat insulating layer, a recording layer developing a color of cyan, a heat insulating layer, a recording layer developing a color of yellow, and a protection film on a support base in this order. In the present experiment, it was assumed that an infrared ray laser causing one having a wavelength, to oscillate, corresponding to a photothermal conversion material included in the recording layer developing the color of magenta be used as light applied on the recording layer and that an absorption rate thereof be 30%.

First, as an experimental example 1, a case was simulated where the above-described recording medium was directly irradiated with the infrared ray laser and recording was performed. In the above case, a case where the optical thin film 13 had infrared ray (IR) reflectance of 100% was assumed as an experiment example 1-1, and a case of IR reflectance of 80% was assumed as an experiment example 1-2. Next, as an experimental example 2, a case was simulated where a reflection-type polarizer was disposed on the recording medium and recording was performed. In the above case, a case where the optical thin film 13 had infrared ray (IR) reflectance of 100% was assumed as an experiment example 2-1, and a case of IR reflectance of 80% was assumed as an experiment example 2-2. Furthermore, a case was simulated where a recording medium without the optical thin film 13 was directly irradiated with infrared laser and recording was performed as an experimental example 3.

FIG. 11 is a summary of the simulation results and illustrates a relationship between the intensity of the light absorbed by the recording layer and IR reflectance in each of the experimental examples 1 to 3. It was found that an amount of the light absorbed by the recording layer in the experimental examples 1 and 2 was larger than that in the experimental example 3. From this, it was found that it was possible to achieve a higher speed of recording on the recording layer. Furthermore, since it is possible to increase an absorption amount of light at the same light source intensity and with the same irradiation time, it was found that it is possible to reduce the photothermal conversion material used for the recording layer. It was found that it is possible to reduce coloring in an unrecorded region and improve display quality since the absorption of the wavelength in the visible region by the photothermal conversion material is reduced by reducing the amount of the photothermal conversion material included in the recording layer.

The present disclosure has been described above referring to the first and second fourth embodiments and Examples. However, the present disclosure is not limited to modes described above in the embodiments and the like, and it is possible to variously modify the present disclosure. For example, it is not necessary to include all the components described above in the embodiments or the like, and another component may be further included. Furthermore, the material and the thickness of the component described above are merely examples and are not limited to those described above.

Moreover, in the second embodiment described above, the recording medium 2 in which the two layers including the coloring compounds that cause respective colors different from each other to appear are laminated is indicated as the recording medium that allows for multicolor display; however, this is non-limiting. For example, it is possible to form a recording medium that allows for multicolor display by fabricating three kinds of microcapsules and forming a recording layer by using them. The three kinds of microcapsules each include corresponding one of coloring compounds that cause colors different from each other (for example, magenta (M), cyan (C), and yellow (Y)) to appear, a developing/reducing agent corresponding to the coloring compound, and corresponding one of photothermal conversion materials that absorb light in wavelengths different from each other and generate heat.

Moreover, in the embodiments or the like described above, an example has been indicated in which each recording layer is colored and decolored by using the laser; however, this is non-limiting. For example, coloring and decoloring may be performed by using a thermal head.

Note that the effects described herein are only exemplary and non-limiting. Furthermore, any other effect may be provided.

Note that it is possible for the present disclosure to have the following configurations.

(1)
A recording medium including:
a recording layer that includes a heat-sensitive color-developing composition and a photothermal conversion material, the photothermal conversion material absorbing a wavelength in an infrared region and generating heat; and
an optical thin film that is provided on one surface of the recording layer, the optical thin film reflecting the wavelength in the infrared region and transmitting a wavelength in a visible region.

(2)
The recording medium according to (1) described above, further including a diffuse reflection layer on side of the one surface of the recording layer with the optical thin film in between, the diffuse reflection layer reflecting and diffusing the wavelength in the visible region.

(3)
The recording medium according to (1) or (2) described above, in which the optical thin film includes two kinds of inorganic films that are alternately laminated, the two kinds of inorganic films having respective refractive indices different from each other in a wavelength range from the infrared region to the visible region.

(4)
The recording medium according to any one of (1) to (3) described above, in which the recording layer includes a coloring compound and a developing/reducing agent as the heat-sensitive color-developing composition.

(5)
The recording medium according to any one of (1) to (4) described above, in which the recording layer includes two or more layers that are laminated.

(6)
The recording medium according to (5) described above, in which the two or more layers allow respective colors to appear, the colors being different from each other.

(7)
The recording medium according to (6) described above, in which the recording layer includes a heat insulating layer in each of regions between the two or more layers.

(8)
The recording medium according to any one of (4) to (7) described above, in which the coloring compound includes a leuco dye.

(9)
The recording medium according to any one of (1) to (8) described above, in which the recording layer varies reversibly between a recorded state and a deleted state.

(10)
The recording medium according to any one of (1) to (9) described above, in which the recording layer includes a protection film on another surface opposed to the one surface.

(11)
An exterior member including
at least a decorated surface provided with a recording medium disposed on a support base,
the recording medium including
a recording layer that includes a heat-sensitive color-developing composition and a photothermal conversion material, the photothermal conversion material absorbing a wavelength in an infrared region and generating heat, and
an optical thin film that is provided on one surface of the recording layer, the optical thin film reflecting the wavelength in the infrared region and transmitting a wavelength in a visible region.

(12)
A method of recording on a recording medium including
irradiating a recording medium with light including at least a wavelength in an infrared region to perform drawing on a recording layer, the recording medium including an optical thin film and the recording layer that are laminated in this order, the optical thin film reflecting the wavelength in the infrared region and transmitting a wavelength in a visible region, the recording layer including a heat-sensitive color-developing composition and a photothermal conversion material, the photothermal conversion material absorbing the wavelength in the infrared region and generating heat.

(13)
The method of recording on the recording medium according to (12) described above, in which
infrared laser is used as a light source, and
a reflection-type polarizer is disposed between the light source and the recording medium, and the infrared laser is multiply reflected between the optical thin film and the reflection-type polarizer.

The present application claims priority based on Japanese Patent Application No. 2017-243544 filed with the Japan Patent Office on Dec. 20, 2017, the entire content of which is incorporated herein by reference.

It should be understood that those skilled in the art would make various modifications, combinations, sub-combinations, and alterations depending on design requirements and other factors, and they are within the scope of the attached claims or the equivalents thereof.

The invention claimed is:

1. A recording medium comprising:
a recording layer that includes a heat-sensitive color-developing composition and a photothermal conversion material, the photothermal conversion material absorbing a wavelength in an infrared region and generating heat; and
an optical thin film that is provided on one surface of the recording layer, the optical thin film reflecting the wavelength in the infrared region and transmitting a wavelength in a visible region,
wherein the optical thin film includes two kinds of inorganic films that are alternately laminated, the two kinds of inorganic films having respective refractive indices different from each other in a wavelength range from the infrared region to the visible region.

2. The recording medium according to claim 1, further comprising a diffuse reflection layer on the one surface of the recording layer, wherein the optical thin film is in between the recording layer and the diffuse reflection layer, and wherein the diffuse reflection layer reflecting and diffusing the wavelength in the visible region.

3. The recording medium according to claim 1, wherein the recording layer includes a coloring compound and a developing/reducing agent as the heat-sensitive color-developing composition.

4. The recording medium according to claim 1, wherein the recording layer includes two or more layers that are laminated.

5. The recording medium according to claim 4, wherein the two or more layers allow respective colors to appear, the colors being different from each other.

6. The recording medium according to claim 5, wherein the recording layer further includes a heat insulating layer between each of the two or more layers that allow respective colors to appear.

7. The recording medium according to claim 3, wherein the coloring compound comprises a leuco dye.

8. The recording medium according to claim 1, wherein the recording layer can reversibly change between a recorded state and a deleted state.

9. The recording medium according to claim 1, wherein the recording medium further includes a protection film on another surface of the recording layer that is opposed to the one surface.

10. An exterior member comprising
at least a decorated surface provided with a recording medium disposed on a support base,
the recording medium including
a recording layer that includes a heat-sensitive color-developing composition and a photothermal conversion material, the photothermal conversion material absorbing a wavelength in an infrared region and generating heat, and
an optical thin film that is provided on one surface of the recording layer, the optical thin film reflecting the wavelength in the infrared region and transmitting a wavelength in a visible region,
wherein the optical thin film includes two kinds of inorganic films that are alternately laminated, the two kinds of inorganic films having respective refractive indices different from each other in a wavelength range from the infrared region to the visible region.

11. A method of recording on a recording medium comprising
irradiating a recording medium with light including at least a wavelength in an infrared region to perform drawing on a recording layer, the recording medium including an optical thin film and the recording layer that are laminated in this order, the optical thin film reflecting the wavelength in the infrared region and transmitting a wavelength in a visible region, the recording layer including a heat-sensitive color-developing composition and a photothermal conversion material, the photothermal conversion material absorbing the wavelength in the infrared region and generating heat,
wherein the optical thin film includes two kinds of inorganic films that are alternately laminated, the two kinds of inorganic films having respective refractive indices different from each other in a wavelength range from the infrared region to the visible region.

12. The method of recording on the recording medium according to claim 11, wherein
infrared laser is used as a light source, and
a reflection-type polarizer is disposed between the light source and the recording medium, and the infrared laser is multiply reflected between the optical thin film and the reflection-type polarizer.

* * * * *